June 9, 1931.  W. R. JOHNSON  1,809,127
COUPLING AND VALVE
Filed April 1, 1930
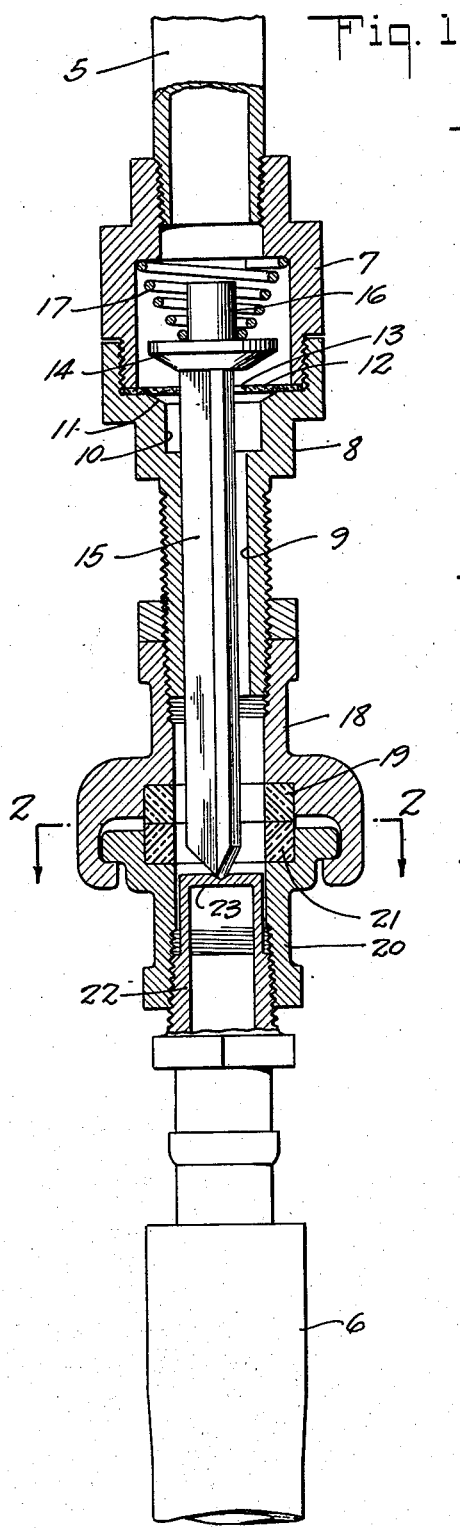
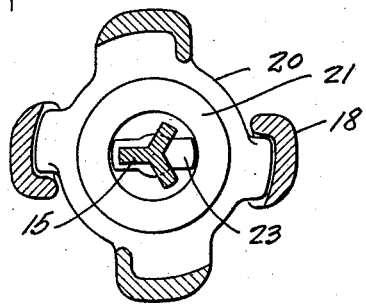
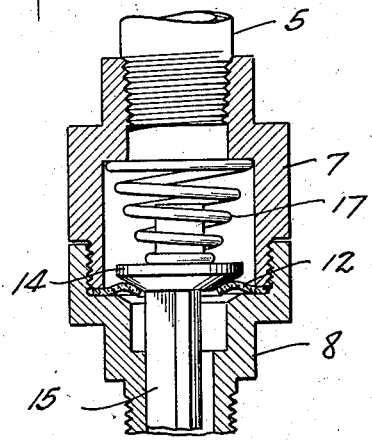
INVENTOR
Wayne R. Johnson
BY
Westall and Wallace
ATTORNEYS Patented June 9, 1931

1,809,127

UNITED STATES PATENT OFFICE

WAYNE R. JOHNSON, OF SOUTHGATE, CALIFORNIA

COUPLING AND VALVE

Application filed April 1, 1930. Serial No. 440,741.

This invention relates to a hose or pipe coupling, embodying an automatic valve for use in conducting fluid pressure. The invention has as one of its field of uses the connection of vacuum lines employed in operating the brakes of automotive trailers. Motor vehicles serving as tractors for trailers are commonly equipped with a vacuum line for operating the brakes. Trailers are likewise equipped with such vacuum controlled brakes, as the motor vehicle carries the source of vacuum, the trailer line and motor line are provided with a coupling. The use of such a coupling necessitates a valve to close the vacuum line when the trailer is detached. Quick couplings are commonly employed and automatic valves have been provided which are opened by engaging the elements of the coupling in coupled position and automatically close on uncoupling. The present invention relates to such a device. In such devices it is the current practice to employ resilient means to maintain the valve seated in uncoupled position. However, vibration causes the valve to chatter and leave its seat. This causes loss of vacuum in the line and seriously affects the operation of the brakes.

The primary object of the present invention is to provide an automatic valve which will remain closed under vibrational movement and to this end an auxiliary valve seat is provided.

This object together with other objects and corresponding accomplishments are obtained by means of the embodiment of my invention illustrated in the accompanying drawings, in which:—

Fig. 1 is a longitudinal section through a coupling, the valve being shown in unseated position; Fig. 2 is a section as seen on the line 2—2 of Fig. 1; Fig. 3 is a perspective view of the auxiliary seat; and Fig. 4 is a fragmentary sectional view showing the valve partially unseated.

Referring with more particularity to the drawings, 5 marks the vacuum line adapted to be connected to the source of vacuum, such as on a motor vehicle. The vacuum line on the adjacent vehicle such as a trailer is denoted by 6. Intermediate the lines 5 and 6 is a coupling which in coupled position forms a part of the entire vacuum line.

Threaded onto the tube 5 is a valve stem shell 7. The other end of the shell is shouldered and provided with threads to receive valve stem member 8. The valve stem member has a passage 9 enlarged in diameter at the valve end as indicated by 10, and is provided with a tapered valve seat 11. Clamped between the stem member and the valve shell 7 is an auxiliary seat 12 of pliant material, such as leather. There is a bore 13 through which the valve stem passes.

Mounted in the valve chamber is a valve head 14 having a seating face corresponding to the tapered valve seat 11 and provided with a stem 15 and a stud 16. The cross section of the stem is such that a passageway is provided between the bore of the tubular part of the stem member 8 and the stem itself. A compression spring 17 tends to seat the valve. When seated, it will depress the auxiliary valve seat 12 and form a liner for the seat 11. Normally the auxiliary seat is flat as shown in Fig. 1. Threaded on to the tubular end of stem member 8 is a coupling member 18 having a gasket packing 19 and adapted to be engaged or coupled to a member 20 having a packing gasket 21. Members 18 and 20 may be of any well known conventional type of coupling. Member 20 is mounted upon a contact extension 22 having a bridge 23 for engaging the end of stem 15 and unseating the valve in coupled position. When members 18 and 20 are disengaged, the spring 17 will seat the valve.

The device comprises broadly a coupling having a valve member and a contact member and as shown these members are built up of parts for convenience in assemblage. Due to the fact that a leather auxiliary seat is used which serves as a liner, it is not necessary to grind the valve head or seat. If vibration tends to cause the valve 14 to chatter and unseat, the auxiliary seat will follow the valve head and maintain a leak tight fit, as shown in Fig. 4. It will be noted that the inner edge of auxiliary seat 12 overhangs the valve port and chamber 10. This provides for an area upon which pressure will act to cause the auxiliary valve to initially start away from seat 11 and follow the valve head 14. Thus the valve is maintained closed until positively unseated as shown in Fig. 1.

What I claim is:—

1. A valve coupling embodying two sections for forming a part of a fluid pressure line, one of said sections constituting a valve member and the other a contact member: said valve member having a valve cage chamber and a valve stem chamber with a main valve seat interposed between the chambers, an auxiliary sealing seat of limp material disposed over said main seat with a free edge adapted to clear the face thereof and depressible onto the face of said seat to form a liner therefor; a valve having a stem, means tending to seat said valve, said auxiliary seat being engageable with and following said valve in partially unseated position to seal the latter; said contact member having means to engage said stem when in coupled relation and unseat said valve from both seats.

2. A valve coupling embodying two sections for forming a part of a fluid pressure line, one of said sections constituting a valve member and the other a contact member: said valve member having a valve cage chamber and a valve stem chamber with a tapered valve seat interposed between the chambers, an auxiliary sealing seat of limp material disposed over said tapered seat normally in flat position clearing the face of said tapered seat and depressible onto the face of said tapered seat to form a liner therefor; a valve having a head corresponding to the face of said tapered seat and a stem, means tending to seat said valve said auxiliary seat being engageable with and following said valve in partially unseated position to seal the latter; said contact member having means to engage said stem when in coupled relation and unseat said valve from both seats.

In witness that I claim the foregoing I have hereunto subscribed my name this 19th day of March, 1930.

WAYNE R. JOHNSON.